(12) United States Patent
Lin et al.

(10) Patent No.: US 8,389,666 B2
(45) Date of Patent: Mar. 5, 2013

(54) COPOLYMER AND METHOD FOR MANUFACTURING THE SAME AND PACKAGING MATERIAL UTILIZING THE SAME

(75) Inventors: Chih-Hsiang Lin, Taipei (TW); Ya-Lan Chuang, Lioujia Township, Tainan County (TW); Pei-Jung Tsat, Cingshuei Township, Taichung County (TW); Shu-Ling Yeh, Yangmei Township, Taoyuan County (TW); Chin-Lang Wu, Tongsiao Township, Miaoli County (TW); Cing-Jiuh Kang, Hsinchu (TW); Hsin-Ching Kao, Baoshan Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 94 days.

(21) Appl. No.: 12/983,541

(22) Filed: Jan. 3, 2011

(65) Prior Publication Data

US 2011/0098437 A1 Apr. 28, 2011

Related U.S. Application Data

(62) Division of application No. 12/049,427, filed on Mar. 17, 2008, now abandoned.

(30) Foreign Application Priority Data

Oct. 29, 2007 (TW) ................................ 96140578 A

(51) Int. Cl.
  *C08G 63/00* (2006.01)
(52) U.S. Cl. ......... 528/307; 528/272; 528/304; 528/305
(58) Field of Classification Search .................. 528/272, 528/307
  See application file for complete search history.

(56) References Cited

U.S. PATENT DOCUMENTS

| | | | |
|---|---|---|---|
| 4,381,379 A * | 4/1983 | Toga et al. | 525/444 |
| 4,742,151 A | 5/1988 | Tate et al. | |
| 2007/0059465 A1 | 3/2007 | Thompson et al. | |

FOREIGN PATENT DOCUMENTS

| | | |
|---|---|---|
| CN | 1556821 | 12/2004 |
| CN | 1849365 | 10/2006 |

OTHER PUBLICATIONS

English language translation of abstract of CN 1556821 (published Dec. 22, 2004).
English language translation of abstract of CN 1849365 (published Oct. 18, 2006).

* cited by examiner

*Primary Examiner* — Ling Choi
*Assistant Examiner* — Gennadiy Mesh
(74) *Attorney, Agent, or Firm* — McClure, Qualey & Rodack, LLP

(57) ABSTRACT

The disclosed is a copolymer having a formula as:

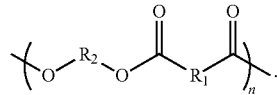

$R_1$ is a combination of naphthalene, phenylene, butyl, and hexyl. $R_2$ is a combination of ethylene, cyclohexlene, 2-methylpropyl, and neopentyl. n is a number of 1500 to 3000. The copolymer has a transparency greater than 80%, a thermal resistance greater than 100° C., a moisture absorption less than 0.5 wt %, and yellowing under UV/climate resistance greater than 1000 hours.

8 Claims, No Drawings

COPOLYMER AND METHOD FOR MANUFACTURING THE SAME AND PACKAGING MATERIAL UTILIZING THE SAME

CROSS REFERENCE TO RELATED APPLICATIONS

This application is a Divisional of pending U.S. patent application Ser. No. 12/049,427, filed Mar. 17, 2008 and entitled "Copolymer and method for manufacturing the same and packaging material utilizing the same", which claims priority of Taiwan Patent Application No. 096140578, filed on Oct. 29, 2007, the entirety of which is incorporated by reference herein.

BACKGROUND OF THE INVENTION

1. Field of the Invention

The invention relates to a copolymer, and in particular to a packaging material utilizing the same and monomers thereof.

2. Description of the Related Art

For light-emitting devices, packaging materials are fairly important. For example, the packaging material used in light-emitting diodes (hereinafter LED) should have several properties such as transparency, thermal resistance, crystallinity, and impact resistance. Polyester is widely used as a packaging material, but still possesses some shortcomings. For instance, poly ethylene terephthalate (hereinafter PET) has a $T_g$ of about 70° C., such that the PET does not meet requirements of high thermal resistance (Tg>100° C.) in LED packaging material. Some related arts replace the monomer terephthalic acid, so-called 1,4-benzenedicarboxylic acid, with 2,6-naphthalenedicarboxylic acid to form poly(ethylene 2,6-naphthalate) (hereinafter PEN) to solve the described problem. The PEN has higher crystallinity than PET and the $T_g$ of PEN achieves 108° C., thereby effectively enhancing the thermal resistance of the packaging material utilizing the same. However, the PEN forms crystalline easily due to its high crystallinity, therefore reducing transparency and being unfavorable to form a molten state using injection packaging. Meanwhile, some related arts blend the previously described two polymers and combine the easier processed, PET and the thermal resistant, PEN. Nevertheless, because the blend standard is not unified and blend properties is easily influenced by polymerizing degree or molar ratio of PET and/or PEN, practical application of the blend confront difficulties such as reproduction and magnification. Thus, designing a novel polymer structure is called for, to combine the advantages of PET and PEN and standardizing packaging material properties.

SUMMARY OF THE INVENTION

The invention provides a copolymer, having a general formula:

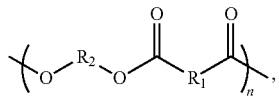

wherein $R_1$ is a combination of naphthalene and phenyl; $R_2$ is a combination of 2-methyl-1,3-propylene and ethylene, wherein 2-methyl-1,3-propylene and ethylene have a molar ratio of about 20:80; n is an integer; and the copolymer has a inherent viscosity of about 0.3 to about 0.65 dL/g.

The invention also provides a packaging material, comprising the described copolymer.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Shortcomings such as insufficient thermal resistance of PET and inadequate transparency of PEN can be improved by the copolymer of the invention. The copolymer of the invention has a general formula as:

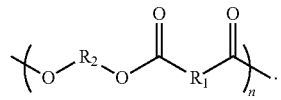

$R_1$ is a combination of naphthalene, phenyl, butyl, and hexyl. $R_2$ is a combination of cyclohexylene dimethylene, ethylene, 2-methylpropyl, and neopentyl. n is 1500 to 3000. The phenyl can be 1,2-phenyl, 1,3phenyl, 1,4-phenyl, or combinations thereof, the naphthalene can be 1,4-naphthalene, 2,3-naphathalene, 2,6-naphathalene, or combinations thereof. Under the condition that easterification condensation is not influenced, other phenyl and naphthalene substitute positions can be functional groups such as alkyl or halogen. The described phenyl or naphthalene comes from benzene dicarboxylic acid and naphthalene dicarboxylic acid, respectively. After condensation, the ester position is determined by the acid position substituted on the benzene and/or naphthalene.

If the molar ratio of the naphthalene in $R_1$ is higher than 90%, the crystallinity of the copolymer will be too high and transparency thereof is reduced. For improving transparency, part of the ethylene is replaced with cyclohexylene dimethylene, 2-methylpropylene, and neopentylene to break the crystallinity, thereby enhancing the transparency of the copolymer. On the basis of the described reason, part of the phenyl and naphthalene can be replaced with butyl and hexyl.

The molar ratio of cyclohexylene dimethylene, 2-methylpropylene, neopentylene, and ethylene can be tuned according to the molar ratio of naphthalene, phenyl, butyl, and hexyl. If naphthalene has higher molar ratio, the high crystallininty will reduce the transparency. If naphthalene has a lower molar ratio, the requirement of high thermal resistance will not be met.

The described cyclohexylene dimethylene can be cis-1,2-cyclohexylene dimethylene, trans-1,2-cyclohexylene dimethylene, cis-1,3-cyclohexylene dimethylene, trans-1,3-cyclohexylene dimethylene, cis-1,4-cyclohexylene dimethylene, trans-1,4-cyclohexylene dimethylene, or combinations thereof. The described cyclohexylene dimethylene comes from cyclohexylene dimethanol, the ethylene comes from ethylene glycol, respectively. After condensation, the ester position is determined by the methanol position substituted on the cyclohexane. It is understood that the copolymer crystallinity depends on the steric structure. Accordingly, tuning the acid/alcohol substitution position may modify the thermal resistance and transparency of the copolymer in embodiments of the invention.

The invention also provides a method for forming the described copolymer. First, providing a diol combination and a diacid combination, and these two combinations have same molar ratio. The diol combination is a combination of cyclohexylene dimethanol, ethylene glycol, 2-methyl-1,3-propylene glycol, and neopentylene glycol. The diacid combination is a combination of naphthalene dicarboxylic acid, benzene dicarboxylic acid, succinic acid, and adipic acid. Subsequently, a mixture of the diol combination and the diacid combination is heated to process condensation polymerization to form the copolymer. The copolymer has the general formula:

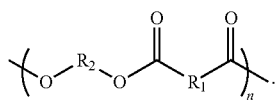

$R_1$ is a combination of naphthalene, phenyl, butyl, and hexyl. $R_2$ is a combination of cyclohexylene dimethylene, ethylene, 2-methylpropyl, and neopentyl. n is 1500 to 3000. As described above, the phenyl can be 1,2-phenyl, 1,3phenyl, 1,4-phenyl, or combinations thereof, the naphthalene can be 1,4-naphthalene, 2,3-naphathalene, 2,6-naphathalene, or combinations thereof, and the cyclohexylene dimethylene can be cis-1,2-cyclohexylene dimethylene, trans-1,2-cyclohexylene dimethylene, cis-1,3-cyclohexylene dimethylene, trans-1,3-cyclohexylene dimethylene, cis-1,4-cyclohexylene dimethylene, trans-1,4-cyclohexylene dimethylene, or combinations thereof.

In one embodiment of the invention, the described copolymer is injection molded to package a light-emitting device such as LED. The described copolymer has a transparency greater than 80%, a thermal resistance greater than 100° C., a moisture absorption less than 0.5 wt %, and a yellowing resistance under UV and/or climate greater than 1000 hours.

Example 1

2,6-naphthalene dicarboxylic acid (hereinafter NDC) and 1,4-benzene dicarboxylic acid were weighted according to an appropriate molar ratio to be served as a diacid combination. Cis/trans 1,4-cyclohexylene dimethanol (hereinafter CHDM) and ethylene glycol were weighted according to an appropriate molar ratio to be served as a diol combination thereof. The diacid combination and the diol combination were charged in a round bottom bottle, heated to 240-290° C. and then vacuumed for processing condensation polymerization to yield a copolymer. The copolymer properties such as inherent viscosity, Tg, transparency, and yellowing resistance were measured. The monomer molar ratio and the copolymer properties were tabulated as in Table 1.

TABLE 1

| | | | | | | | | | | |
|---|---|---|---|---|---|---|---|---|---|---|
| NDC content (mol %) | 36 | 51 | 51 | 58 | 0 | 73 | 80 | 87 | 94 | 100 |
| CHDM content (mol %) | 30 | 30 | 70 | 80 | 100 | 30 | 30 | 30 | 30 | 30 |
| Inherent viscosity | 0.62 | 0.57 | 0.58 | 0.60 | 0.63 | 0.63 | 0.60 | 0.51 | 0.42 | 037 |
| $T_g$ ( ) | 93.78 | 96.57 | 97.28 | 97.28 | 84.61 | 105 | 106.68 | 108.0 | 108.47 | 108.74 |
| Transparency (%) | 86 | 85 | 85 | 84 | 88 | 84 | 84 | 83 | 83 | 83 |
| Yellowing resistance under UV (hour) | 1000 | 1000 | 1500 | 1500 | 2000 | 1000 | 1000 | 1000 | 1000 | 1000 |

Referring to Table 1, all of the copolymers of the invention have transparencies greater than 80% and yellowing resistance under UV and/or climate greater than 1000 hours.

Example 2

In this Example, the molar ratio of CHDM and ethylene glycol is tuned to measure the copolymer properties.

TABLE 2

| | Product No. | | | | | |
|---|---|---|---|---|---|---|
| | PET-C-1 | PET-C-2 | PET-C-3 | PET-C-4 | PET-C-5 | PET-C-6 |
| CHDM (mol %) | 5 | 10 | 15 | 20 | 25 | 30 |
| Inherent viscosity | 0.46 | 0.59 | 0.54 | 0.53 | 0.50 | 0.51 |
| $T_g$ (° C.) | 77.23 | 76.37 | 73.07 | 73.81 | 77.8 | 77.11 |
| $T_{ch}$ (° C.) | 159.2 | 167.78 | 162.88 | — | — | — |
| $T_{cc}$ (° C.) | 151.09 | 148.01 | 155.9 | — | — | — |
| $T_m$ (° C.) | 241.42 | 225.99 | 217.51 | 206.07 | 194.9 | — |

Note:
— means the signal peak disappears.

In Table 2, $T_{ch}$ means the temperature of crystallization measured while heating from the solid state, $T_{cc}$ means the temperature of crystallization measured while cooling from the melt, and $T_m$ means the crystalline melting temperature. As shown in Table 2, when the molar ratio of CHDM and ethylene glycol is greater than 20:80, the copolymer is amorphous. The copolymer transparency was therefore enhanced and the back-end processing of the injection molding is improved. The disappearance of Tcc, Tch, and Tm peak means that the copolymer exhibits an amorphous state.

Example 3

In this example, part of ethylene glycol is replaced with 2-methyl-1,3-propylene glycol or neopentylene glycol, and part of 1,4-benzene dicarboxylic acid is replaced with succinic acid or adipic acid. The copolymer properties were shown as in Table 3.

TABLE 3

|  | PET-apidic acid | PET-succinic acid | PET-2-methyl-1,3-propylene glycol | PET-neopentylene glycol |
| --- | --- | --- | --- | --- |
| Introduced monomer | Adipic acid | Succinic acid | 2-methyl-1,3-propylene glycol | Neopentylene glycol |
| mol % | 20 | 20 | 20 | 20 |
| Inherent viscosity | 0.54 | 0.62 | 0.59 | 0.65 |
| $T_g$ (° C.) | 53.5 | 60.8 | 62.3 | 71.25 |
| $T_{ch}$ ( ) | — | — | — | — |
| $T_{cc}$ ( ) | — | — | — | — |
| $T_m$ ( ) | — | — | — | — |

Note:
— means the signal peak is disappear.

As shown in Table 3, the copolymers introduced by 2-methyl-1,3-propylene glycol, neopentylene glycol, succinic acid, and adipic acid were amorphous. The copolymer transparency was therefore enhanced and the back-end processing of the injection molding is improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A copolymer, having a general formula:

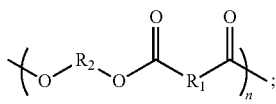

wherein $R_1$ is a combination consisting of naphthalene and phenyl;

$R_2$ is a combination consisting of 2-methyl-1,3-propylene and ethylene, wherein 2-methyl-1,3-propylene and ethylene have a molar ratio of about 20:80;

n is an integer; and the copolymer has a inherent viscosity of about 0.3 to about 0.65 dL/g.

2. The copolymer as claimed in claim 1, wherein the naphthalene comprises 1,4-naphthalene, 2,3-naphathalene, 2,6-naphathalene, or combinations thereof.

3. The copolymer as claimed in claim 1, wherein the phenyl comprises 1,2-phenyl, 1,3phenyl, 1,4-phenyl, or combinations thereof.

4. The copolymer as claimed in claim 1 having a transparency greater than 80%.

5. The copolymer as claimed in claim 1 having a thermal resistance greater than 100° C.

6. The copolymer as claimed in claim 1 having a moisture absorption less than 0.5 wt %.

7. The copolymer as claimed in claim 1 having a yellowing resistance under UV and/or climate greater than 1000 hours.

8. A packaging material, comprising the copolymer as claimed in claim 1.

* * * * *